United States Patent [19]
Ross

[11] 4,127,924
[45] Dec. 5, 1978

[54] METHOD OF ASSEMBLING ELECTRICAL CONNECTORS

[76] Inventor: Milton I. Ross, 400 College Ave., Haverford, Pa. 19041

[21] Appl. No.: 803,846

[22] Filed: Jun. 6, 1977

Related U.S. Application Data

[62] Division of Ser. No. 725,962, Sep. 23, 1976, Pat. No. 4,043,452.

[51] Int. Cl.² .............................................. B23P 17/00
[52] U.S. Cl. ........................................ 29/413; 29/418; 29/453; 29/229; 29/758; 29/757
[58] Field of Search ............... 29/229, 413, 418, 453, 29/758, 629, 757; 339/217 S, 217 R; 206/230, 231, 340, 346; 85/8.8

[56] References Cited

U.S. PATENT DOCUMENTS

| | | | |
|---|---|---|---|
| 2,811,702 | 10/1957 | Narozny | 206/820 |
| 3,396,461 | 8/1968 | Spooner et al. | 29/413 |
| 3,707,226 | 12/1972 | Wippermann | 206/346 |
| 3,846,900 | 11/1974 | Weglage | 29/229 |
| 4,045,868 | 9/1977 | Ammon et al. | 29/629 |

*Primary Examiner*—Michael J. Keenan
*Attorney, Agent, or Firm*—Edelson and Udell

[57] ABSTRACT

A miniature electrical connector comprising an insulative body having spaced, parallel connector pins extending therethrough and held in place by a combination of abutment surfaces on the pins and block, and "C" rings on the pins. In assembling the connector, the "C" rings are formed as part of a metal stamping, and are urged as a unit onto corresponding ones of the pins extending through the body. The "C" rings are released from the stamping by bending the latter along suitably formed fracture lines.

7 Claims, 9 Drawing Figures

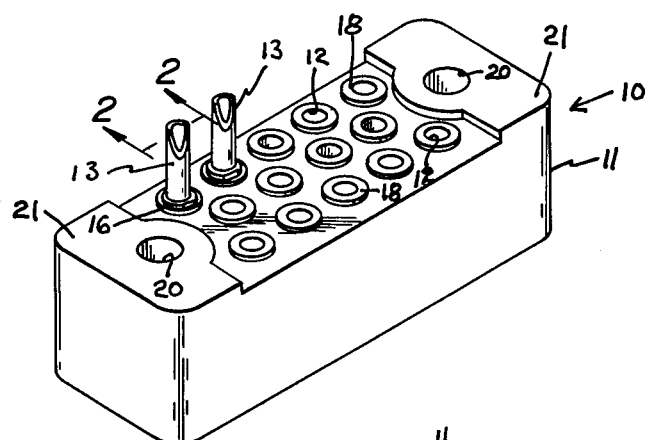
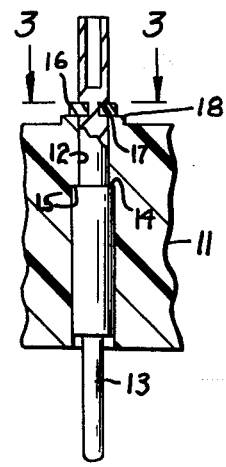
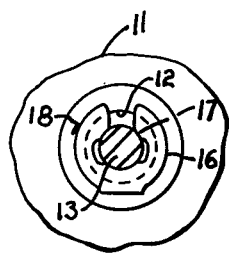
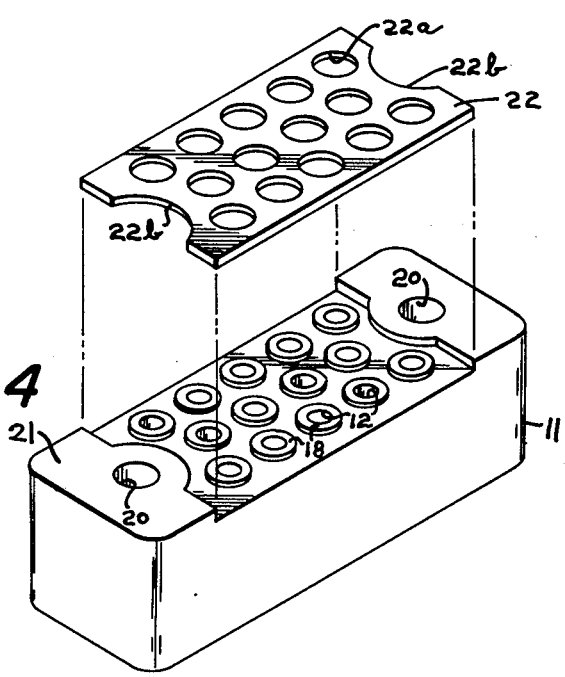
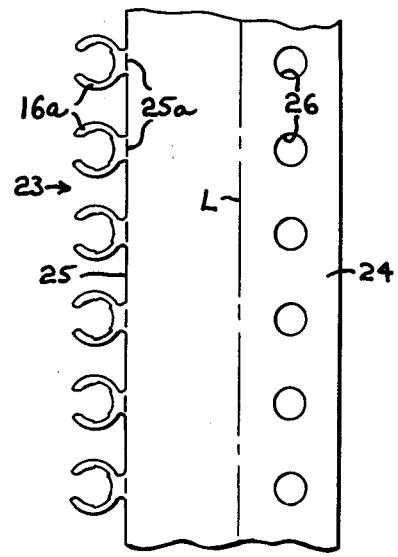

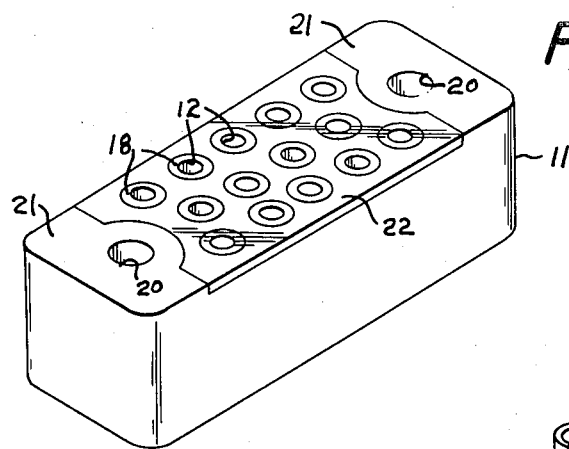
FIG. 6
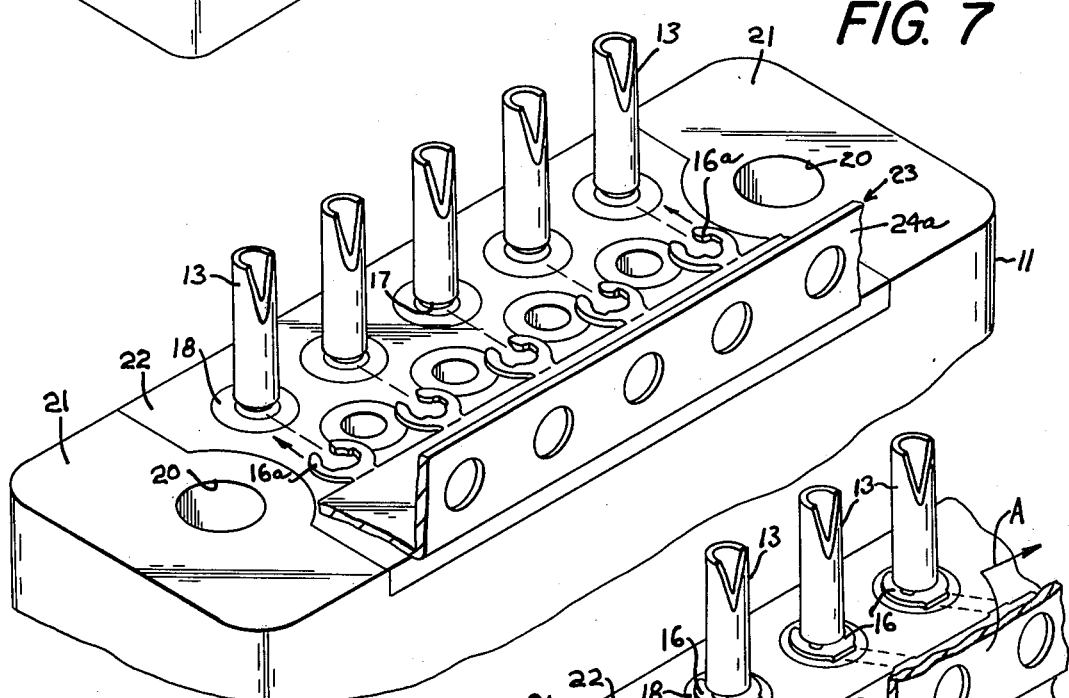
FIG. 7
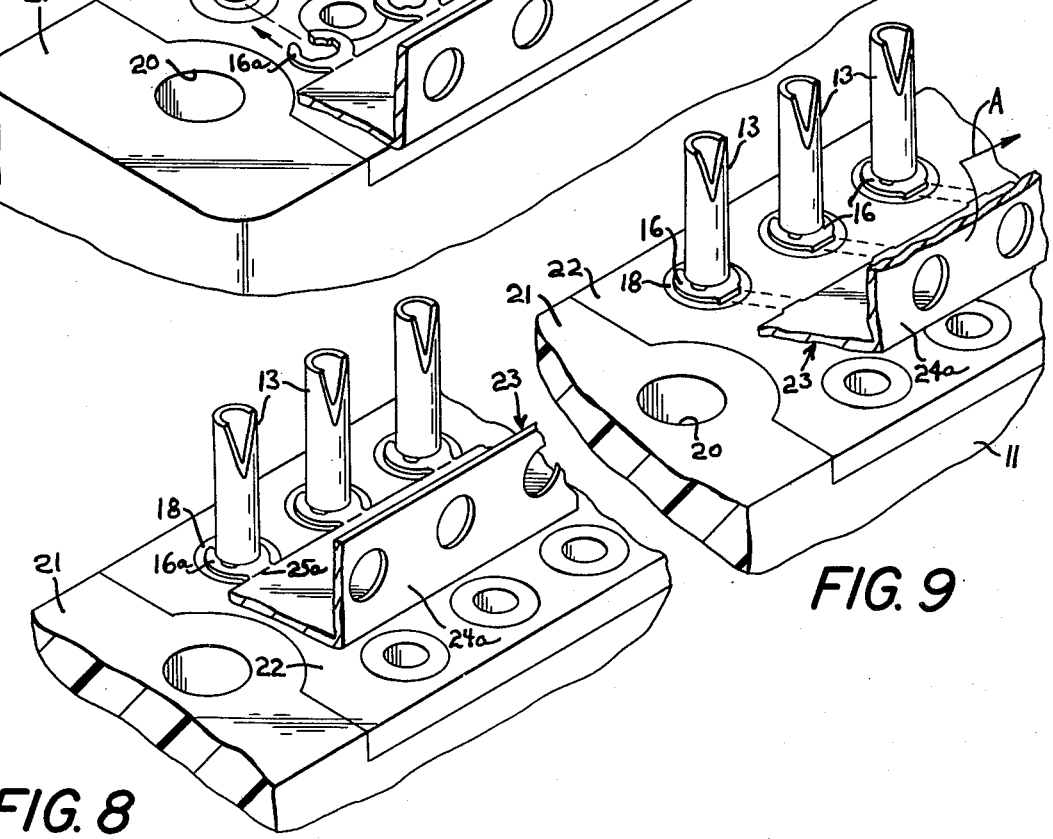
FIG. 8
FIG. 9

METHOD OF ASSEMBLING ELECTRICAL CONNECTORS

This is a division of application Ser. No. 725,962 filed Sept. 23, 1976, now U.S. Pat. No. 4,043,452.

BACKGROUND OF THE INVENTION

This invention relates to electrical component assembly, and more particularly to an improved method and apparatus useful in the assembly of electrical connectors of the so-called miniature, subminiature, and microminiature types.

Connectors of the above-mentioned types comprise electrically insulative bodies of generally rectangular configuration and having closely spaced rows of closely spaced parallel tubular openings extending at right angles to opposed parallel surfaces of the connector bodies. Conductive pins extend through these openings beyond the aforesaid surfaces, and means are provided to retain the pins in the blocks. In view of the relatively close spacing of the pins, and of the large quantities thereof, it has been found convenient in the construction of such connectors to provide a shoulder within each tubular opening positioned to engage an offset portion of the pin upon its insertion from one side of the insulative body, and to retain the pin within the body by a "C" ring received within an annular groove on the pin in the region of the opposite surface of the body. This construction affords a connector of suitable electrical characteristics and small dimension. Typically close pin spacings, in the order of 0.150 inch for miniature connectors, 0.125 inch for subminiature connectors, and 0.094 inch for microminiature connectors render an assembly operation somewhat difficult. For example, "C" rings of suitably small size are supplied in bulk to an operator, who must individually select and orient each "C" ring and attach it to a contact pin. Although operators become skilled at this operation, it is by its very nature time-consuming, especially when a single connector may have as many as 104 pins to be assembled into the insulative body.

It is an objective of this invention to provide an improved method and apparatus useful in the assembly of relatively small electrical connectors.

It is a further objective of the invention to provide an improved article of manufacture facilitating storage, orientation, and attachment of relatively small electrical connector components.

SUMMARY OF THE INVENTION

In achievement of the foregoing as well as other objectives and advantages, the invention contemplates provision of an electrically insulative body with connector pins extending therethrough as described above, disposition of a plurality of unitarily supported, unidirectionally presented "C" rings in confronting relationship to said pins, moving said unitarily supported "C" rings into frictional, resilient engagement with said pins, and releasing said "C" rings from the recited support. The invention is featured by support of the "C" rings by suitably formed frangible means capable of being fractured to release the pin-retained "C" rings.

The manner in which the foregoing as well as other objectives and advantages of the invention may best be achieved will be more fully understood from a consideration of the following description, taken in light of the accompanying drawing.

BRIEF DESCRIPTION OF THE DRAWING

FIG. 1 is a perspective view, on a somewhat enlarged scale, of an electrical connector of a type to which this invention is particularly directed;

FIG. 2 is a sectional view, taken generally along the line indicated by arrows 2 — 2 applied to FIG. 1, and illustrating structural features of a connector assembled in accordance with the present invention;

FIG. 3 is a sectional view, taken generally along the line indicated by arrows 3 — 3 applied to FIG. 2, and illustrating further structural features of the connector;

FIG. 4 is an exploded perspective view of a step in the assembly of the connector;

FIG. 5 is a view of a subassembly useful in carrying out the method;

FIG. 6 is an assembled perspective view of the parts seen in FIG. 4, and illustrating a further step in the method;

FIG. 7 is a perspective view of the parts seen in FIGS. 5 and 6, and illustrating their cooperative relationship in carrying out a still further step in the method; and FIGS. 8 and 9 are fragmented perspective views illustrating further and final steps in the method contemplated by the invention.

DESCRIPTION OF THE PREFERRED PRACTICE OF THE INVENTION

With more detailed reference to the drawing, and first to FIGS. 1, 2, and 3, a connector 10 made in accordance with the method comprises a body such as block 11 of electrically insulative material having parallel rows of tubular openings 12. Electrically conductive connector pins 13, only two of which are shown for convenience of illustration, extend through openings 12, and transversely of opposed surfaces of block 11, as best seen in FIG. 2. Also as seen in FIG. 2, each pin 13 includes a shoulder 14 that abuts a similarly formed portion 15 of an opening 12, which shoulder 14 and portion 15 cooperate to establish the desired projections of opposite ends of a pin 13 as respects surfaces of block 11. Retention of each pin 13 is afforded by a "C" ring 16 resiliently and frictionally retained within an annular groove 17 on the pin, and abuttingly engaging an annular boss 18 formed on the surface of block 11 about each opening 12. Block 11 includes mounting, or orientation, openings 20 at opposite ends thereof, and extending through surfaces of bosses 21 that are substantially coplanar with the surfaces of bosses 18.

In especial accordance with method aspects of the invention, reference will now be made to FIGS. 4 to 9. In these figures, the connector to be assembled includes but 14 apertures arranged in three rows (i.e. rows of 5, 4, and 5, respectively). This is for illustrative purposes only, it being understood that the number of connector pins and corresponding apertures may vary considerably, for example from less than 10 to more than 100.

As seen in FIGS. 4 and 6, a levelling plate 22 having the thickness of raised bosses 18 and 21, and both apertured, as seen at 22a and 22b, and contoured to fit about the bosses, is placed on block 11, as seen in FIG. 6. Pins 13 are then inserted in a row of openings 12, to positions in which grooves 17 reside just above the coplanar surfaces of bosses 18, 21, and plate 22. The continuous upper surface about the pin grooves 17 thus presented to an operator advantageously facilitates carrying out the subsequent steps in the method.

With reference to FIG. 5, an article 23, for example a metal stamping, comprises a generally rectangular base portion 24 having an edge 25 provided with an aligned row of unidirectionally presented "C" rings 16a. Article 23 conveniently is stamped from a suitable metal affording desired degree of resilience for the "C" rings. Center-to-center spacing of the "C" rings 16a corresponds to the like spacing of pins 13. The line of juncture 25a of "C" rings 16a to base 24 is scored, or otherwise rendered frangible, so that bending, to be described in what follows, will release the "C" rings. Further to the method, as shown in FIGS. 7, 8, and 9, base 24 may be angled along a line L conveniently to form a mounting portion 24a provided with apertures 26 facilitating grasping the base by hand. Alternatively, the base 24 may be in flat form as shown in FIG. 5 for utilization by suitable automatic ring-attachment apparatus (not shown).

Considering FIG. 7 in more detail, and with levelling plate 22 set in place, pins 13 are inserted upwardly from the lower ends of the rearmost row of openings 12. Insertion distance is controlled by the above described engagement of pin shoulder 14 with abutment surface 15 in opening 11. While pins 13 are suitably held in this position, for example by friction or by resting their lower ends on a rigid surface, a stamping 23 is suitably grasped by an attachment tool or by hand and moved toward pins 13 in a direction to cause spaced free ends of "C" rings 16a to engage and resiliently snap into grooves 17 on pins 13, as is seen in FIG. 8. It will be appreciated that an operator need only align one "C" ring 16a with a groove 17, and then slide the rings across the flush surface presented by levelling plate 22 and bosses 18.

Following the snapping in place of "C" rings 16a and with reference to FIG. 9, the base 24 of stamping 23 is rotated upwardly about the scored regions 25a to fracture the connection of the base to the "C" rings, followed by movement of base 24 away from the row of pins. This motion is indicated generally by the arrow A applied to FIG. 9.

The pin-inserting, "C" ring-attaching, and fracturing operations are repeated for each successive row, assuming the several rows of openings are to be provided with pins. Following attachment of "C" rings 16 to fasten pins 13 in place, the levelling plate is removed, and the connector made ready for use.

It will be understood that the surface of block 11 may be continuous about openings 12, thus negating the need for plate 22. Also, a stamped article 23 may be fabricated in a strip longer than required, and cut to desired lengths as it is used. Moreover, in lieu of stamping, an article of manufacture 23 may be cast, or built-up by frangibly attaching the "C" rings to a suitable support strip. It will be further understood that the disclosed method advantageously is adaptable to being performed using automatic machinery, and that the invention is susceptible to these as well as other modifications within the scope of the appended claims. It will be understood, also, that the term "C" ring used throughout the disclosure to identify fastner 16 is to be given broad connotation, in contemplating use of various types of openended fasteners, such, for example, as wire snap rings, bifurcate spring clips, "C" washers, and the like.

I claim:

1. In the manufacture of electrical connectors of the type having a row of a plurality of closely spaced tubular openings in an electrically insulative body, and connector pins in said openings and having free ends extending beyond at least a generally planar surface of said body, the method which comprises: inserting a plurality of such pins in said openings a predetermined distance so that they extend as recited; providing an array of "C" rings having a dimension affording frictional retention thereof upon snapping of said rings on said free ends, said array of "C" rings being carried on support means by frangible connections so that they have a center-to-center spacing corresponding to the like spacing of said pins; moving said support means to snap a plurality of said "C" rings onto a plurality of said pins in their region of projection through the recited surface of said body, and relatively moving said support means and said body to break the recited frangible connections of the "C" rings and lock the pins in place.

2. The method according to claim 1, and characterized in that said pins are provided with annular grooves which receive said "C" rings.

3. The method according to claim 1, and characterized in that the array of frangibly connected "C" rings are guided into position by directing a "C" ring onto a corresponding one of said pins, and sliding the frangible "C" ring assembly across the recited surface of said body.

4. The method according to claim 3, and characterized in that said surface is provided with an annular boss about each said aperture, and including the further step of disposing a levelling plate on the upper surface of said body, said plate having openings registering with and being larger than the width of said bosses and being of a thickness corresponding to the height of said bosses, said further step being carried out before said step of moving said support means to snap said "C" rings onto said pins.

5. In the manufacture of electrical connectors of the type having at least a row of a plurality of closely spaced apertures extending through an electrically insulative body portion, and connector pins disposed within said apertures and including portions projecting from at least one side of said body portion, the method which comprises: providing a plurality of such pins having annular grooves intermediate end regions thereof; inserting said pins into said apertures so that said annular grooves lie substantially in the plane of a surface of said body portion through which said apertures extend; providing an array of "C" rings having a dimension affording frictional retention thereof in said annular grooves upon snapping of said rings thereon, said array of "C" rings being carried in a row on support means by a frangible connection so that they have a center-to-center spacing corresponding to the like spacing of said pins; moving said support means to snap said row of "C" rings into said annular grooves; and relatively moving said support means and said body portion to effect frangible release of said "C" rings from said support means.

6. The method according to claim 5, wherein each said aperture is provided with an annular boss thereabout at the level of said grooves, and characterized by the further step of disposing a levelling plate on the upper surface of said body portion, said plate having openings shaped and disposed for registry with and around said bosses and being of a thickness corresponding to the height of said bosses, said further step being carried out before said step of moving said support means to snap said row of "C" rings into said annular grooves.

7. In the manufacture of articles of the type having a plurality of spaced openings in a body with each said opening being provided with an annular boss thereabout, and "C" ring receiving elements disposed in said openings having free ends extending beyond a surface of said body with each of said "C" ring receiving elements being retained in said body by a "C" ring disposed thereabout, the method of securing said "C" ring receiving elements in said body which comprises the steps of disposing a levelling plate on the upper surface of said body, said plate having openings shaped and disposed for registry with and around said bosses and being of a thickness corresponding to the height of said bosses, taking an array of "C" rings carried by a support means in such manner that they have a center-to-center spacing corresponding to the like spacing of said "C" ring receiving elements and positioning said array so that the "C" rings thereof are disposed in alignment with correspondingly positioned ones of said "C" ring receiving elements, moving said support means to snap said "C" rings onto the correspondingly aligned ones of said "C" ring receiving elements in the region of projection of said "C" ring receiving elements through the surface of said body to lock each said "C" ring receiving element in position, and releasing the carrying connection between the "C" rings and the support means.

* * * * *